Patented Feb. 18, 1947

UNITED STATES PATENT OFFICE 2,415,917

COMPLEX SALTS CONTAINING LEAD PHTHALATE AND LEAD SALTS OF ALIPHATIC ACIDS

Alexander Stewart, Mountain Lakes, N. J., and Adrian R. Pitrot, Hempstead, and Leonard M. Kebrich, Brooklyn, N. Y., assignors to National Lead Company, New York, N. Y., a corporation of New Jersey No Drawing. Application September 11, 1943, Serial No. 502,067

11 Claims. (Cl. 260—435)

The present invention relates to new and useful complex salts containing lead phthalate and a lead salt of a monobasic saturated aliphatic acid.

An object of the present invention is to produce novel double salts having pigmentary value. Such double salts may be employed either alone or in combination with other pigments in formulating improved paint compositions. Other objects will become apparent from this description of the invention.

In our co-pending application, Serial No. 502,066, filed September 11, 1943, we have described a process for making lead salts of phthalic acid. The present invention is based upon the discovery that if stoichiometric quantities of a monobasic saturated aliphatic acid corresponding to the general formula $C_nH_{2n+1}COOH$ in which $n$ represents the number of carbon atoms be introduced in the general method of preparing lead phthalates disclosed in the said copending application, complex salts will be formed, corresponding to the following general empirical formulae; in which $n$ represents the number of carbon atoms as in the general formula above:

$$4PbC_6H_4(COO)_2 \cdot Pb(C_nH_{2n+1}COO)_2$$
(Type A)

$$PbO \cdot 2PbC_6H_4(COO)_2 \cdot Pb(C_nH_{2n+1}COO)_2$$
(Type B)

According to the present invention compounds classifiable under Type A have been prepared as follows:

(1) Tetra-lead phthalate-lead acetate, $$4PbC_6H_4(COO)_2 \cdot Pb(CH_3COO)_2$$

(2) Tetra-lead phthalate-lead propionate, $$4PbC_6H_4(COO)_2 \cdot Pb(C_3H_5O_2)_2$$

(3) Tetra-lead phthalate-normal lead butyrate, $$4PbC_6H_4(COO)_2 \cdot Pb(C_4H_7O_2)_2$$

(4) Tetra-lead phthalate-lead isobutyrate, $$4PbC_6H_4(COO)_2 \cdot Pb(C_4H_7O_2)_2$$

as well as compounds classifiable under Type B, as follows:

(5) Basic lead phthalate-lead acetate, $$PbO \cdot 2PbC_6H_4(COO)_2 \cdot Pb(C_2H_3O_2)_2$$

(6) Basic lead phthalate-lead propionate, $$PbO \cdot 2PbC_6H_4(COO)_2 \cdot Pb(C_3H_5O_2)_2$$

(7) Basic lead phthalate-lead butyrate, $$PbO \cdot 2PbC_6H_4(COO)_2 \cdot Pb(C_4H_7O_2)_2$$

(8) Basic lead phthalate-lead isobutyrate, $$PbO \cdot 2PbC_6H_4(COO)_2 \cdot Pb(C_4H_7O_2)_2$$

(9) Basic lead phthalate-lead caproate, $$PbO \cdot 2PbC_6H_4(COO)_2 \cdot Pb(C_6H_{11}O_2)_2$$

(10) Basic lead phthalate-lead caprylate, $$PbO \cdot 2PbC_6H_4(COO)_2 \cdot Pb(C_{10}H_{19}O_2)_2$$

(11) Basic lead phthalate-lead stearate, $$PbO \cdot 2PbC_6H_4(COO)_2 \cdot Pb(C_{18}H_{35}O_2)_2$$

(12) Basic lead phthalate-lead 2-ethylbutyrate, $$PbO \cdot 2PbC_6H_4(COO)_2 \cdot Pb[(C_2H_5)_2CHCO_2]_2$$

The compounds, and their methods of manufacture, shown above classified as Type B are more particularly described and claimed in our divisional co-pending application, Serial No. 654,802, filed March 15, 1946.

It will be noted from the above enumerated compounds that the present invention is applicable for the preparation of complex lead salts of phthalic acid and normal, isomeric and substituted monobasic saturated aliphatic acids.

The method of the present invention comprises bringing together in aqueous media the primary reactants: lead monoxide, phthalic acid, or anhydride, and the monobasic acid, whereby a reaction occurs with substantially complete recovery of the complex lead compound in the form of a white precipitate which is sparingly soluble in water.

The manner of bringing the primary reactants together in the aqueous media is not critical. For instance, the phthalic acid (which expression is meant to include phthalic anhydride) may be dissolved in hot water and the hot solution added gradually, preferably with stirring, to an aqueous suspension of lead monoxide and saturated aliphatic acid, or the reactants may simply be mixed with water. Occasionally it may be found desirable to charge the reactants, mixed with water, into a ball, or pebble, mill or similar apparatus in which the reaction is allowed to take place.

The reaction may be carried out at any convenient temperature between about 15° C. and 100° C. In selecting the manner of mixing the reactants together and the temperature at which the reaction is to be carried out the character of the monobasic saturated aliphatic acid should be considered. Where, as is the case in compounds 1–8, inclusive, listed above, the saturated aliphatic acid is water soluble, a ball mill need not be employed, but the reactants may be mixed with water in any suitable vessel. In such case the employment of an elevated temperature, say between about 75° C. and about 95° C., hastens completion of the reaction. However, where the saturated aliphatic acid is not soluble in water but remains solid or gummy, as is the case with compounds 9-12, inclusive, listed above, it is preferable to charge the reactants mixed with water into a ball or pebble mill and conduct the reaction at room temperature, say between about 15° C and 25° C. When an elevated temperature is employed the reactants are kept in contact with each other in the aqueous media, preferably under agitation, until the reaction is completed which usually requires between about 3 hours and about 8 hours. When the reaction is carried out at room temperature, a longer period of time is generally required, sometimes as much as 18 or 20 hours.

The following examples are given to illustrate, but not to limit the present invention.

EXAMPLE 1

*Lead phthalate-lead acetate,*
$4PbC_6H_4(CO_2)_2 \cdot Pb(C_2H_3O_2)_2$ 89.3 grams (.4 mol) of finely powdered lead monoxide, PbO, were suspended in 1200 cc. of water containing 12 grams of 80% acetic acid, (equivalent to .08 mol of acetic anhydride). The suspension was agitated and heated to 70-80° C. A solution of phthalic acid prepared by dissolving 47.4 grams (.32 mol) in 500 cc. of boiling water was gradually added to the suspension over a five hour period. The resultant white product was filtered, washed with 2 liters of hot water, and dried at 85° C. The yield was substantially complete; the product contained 82% lead phthalate and 18% lead acetate. Its specific gravity was found to be 3.246.

EXAMPLE 2

*Basic lead phthalate-lead acetate—*
$PbO \cdot 2PbC_6H_4(CO_2)_2Pb(C_2H_3O_2)_2$ 89.3 grams (.4 mol) of finely powdered lead monoxide, PbO, were suspended in 1200 cc. of water containing 15 grams of 80% acetic acid (equivalent to .1 mol of acetic anhydride). The suspension was agitated and heated to 70-80° C. A solution of phthalic acid made by dissolving 29.6 grams (.2 mol) of phthalic anhydride in 300 cc. of boiling water was gradually added to the suspension over a five hour period. The resultant white product was filtered, washed with 2 liters of hot water, and dried at 85° C. The yield was substantially complete; and the product contained 57.5% lead phthalate, 25.2% lead acetate and 17.3% of combined basic lead oxide. Its specific gravity was found to be 3.73.

EXAMPLE 3

*Lead phthalate-lead propionate—*
$4PbC_6H_4(CO_2)_2Pb(C_3H_5O_2)_2$

A suspension containing 89.3 grams of finely powdered lead monoxide, PbO, in 1200 cc. of water containing 12.15 grams of 97.56% propionic acid was agitated at 70-75° C. and treated over a five hour period with a solution of phthalic acid prepared by dissolving 47.37 grams of phthalic anhydride in 500 cc. of boiling water. The white product, after filtration, washing and drying at 85° C. contained 80.8% lead phthalate and 19.2% lead propionate. It was electrostatic, and its specific gravity was found to be 3.235.

EXAMPLE 4

*Basic lead phthalate-lead propionate—*
$PbO \cdot 2PbC_6H_4(CO_2)_2Pb(C_3H_5O_2)_2$ A suspension containing 89.3 grams of finely powdered lead monoxide, PbO, in 1200 cc. of water containing 15.60 grams of 95% propionic acid was agitated at 70-75° C. and treated over a five hour period with a solution of phthalic acid prepared by dissolving 29.6 grams of phthalic anhydride in about 300 cc. of boiling water. The white product, on filtration, washing and drying at 85° C. contained 56.3% lead phthalate, 26.8% lead propionate and 16.9% of combined basic lead oxide. Its specific gravity was found to be 3.32.

EXAMPLE 5

*Basic lead phthalate-lead butyrate—*
$PbO \cdot 2PbC_6H_4(CO_2)_2Pb(C_4H_7O_2)_2$ 89.3 grams of finely powdered lead monoxide was added to 1200 cc. of water containing 17.6 grams of normal butyric acid. The mixture was agitated and heated to 70-75° C. A solution of phthalic acid prepared by dissolving 29.6 grams of phthalic anhydride in 600 cc. of boiling water was added to the hot suspension of lead oxide over a five hour period. The white product on filtration, washing and drying at 85° C. contained 55.1% lead phthalate, 31.2% lead butyrate and 13.7% of combined basic lead oxide. Its specific gravity was found to be 3.15.

EXAMPLE 6

*Basic lead phthalate-lead isobutyrate—*
$PbO \cdot 2PbC_6H_4(CO_2)_2Pb(C_4H_7O_2)_2$ 89.3 grams of finely powdered lead monoxide was added to 1200 cc. of water containing 17.6 grams of isobutyric acid. The mixture was agitated and heated to 70-75° C. A solution of phthalic acid made by dissolving 29.6 grams of phthalic anhydride in 600 cc. of boiling water was added to the hot suspension of lead oxide over a period of five hours. The white product, on filtration, washing and drying at 85° C. contained 55.1% lead phthalate, 31.2% lead isobutyrate and 13.7% of combined basic lead oxide. Its specific gravity was found to be 3.30.

EXAMPLE 7

*Lead Phthalate-lead butyrate—*
$4PbC_6H_4(CO_2)_2Pb(C_4H_7O_2)_2$ 89.3 grams of finely powdered lead monoxide was added to 1200 cc. of water containing 14.2 grams of 99.5% normal butyric acid. The mixture was agitated and heated at 70-75° C. A solution of phthalic acid prepared by dissolving 47.4 grams of phthalic anhydride in 500 cc. of hot water was added to the hot suspension over a five hour period. The white product, on filtration and drying at 85° C. contained 79.6% lead phthalate and 20.4% lead butyrate. Its specific gravity was found to be 3.01.

EXAMPLE 8

*Lead phthalate-lead isobutyrate—*
$4PbC_6H_4(CO_2)_2 \cdot Pb(C_4H_7O_2)_2$ 89.3 grams of finely powdered lead monoxide was added to 1200 cc. of water containing 14.4 grams of 98% isobutyric acid. The mixture was agitated and heated to 70-75° C. A solution of phthalic acid made by dissolving 29.6 grams of phthalic anhydride in 600 cc. of boiling water was added to the hot suspension of lead oxide over a period of five hours. The white product, on filtration, washing and drying at 85° C. contained 55.1% lead phthalate, 31.2% lead isobutyrate and 13.7% of combined basic lead oxide. Its specific gravity was found to be 3.17.

EXAMPLE 9

*Basic lead phthalate-lead caproate—*
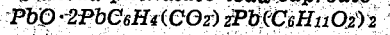

A charge comprising 67 grams powdered lead monoxide, 22.2 grams phthalic anhydride, 17.4 grams of caproic acid and 300 cc. of water was placed in a pebble mill and ground for 16 hours at room temperature (15–20° C.). The white product which was obtained in complete yield contained no uncombined lead phthalate and did not soften or melt when dried at 90° C. Its specific gravity was found to be 2.86.

EXAMPLE 10

*Basic lead phthalate-lead caprylate—*
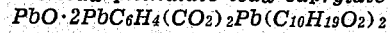

A charge comprising 67 grams of powdered lead monoxide, 22.2 grams of phthalic anhydride, 21.6 grams of caprylic acid and 300 cc. of water was placed in a pebble mill and ground for 16 hours at room temperature (15–20° C.). The white product, obtained in complete yield, contained no uncombined lead phthalate and did not soften or melt when dried at 90° C. Its specific gravity was found to be 2.61.

EXAMPLE 11

*Basic lead phthalate-lead stearate—*
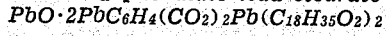

A charge comprising 67 grams of powdered lead monoxide, 22.2 grams of phthalic anhydride, 42.6 grams of stearic acid and 300 cc. of water was placed in a pebble mill and ground for 40 hours at room temperature (15–20° C.). The white product, obtained in complete yield, contained no uncombined stearic acid or lead phthalate, and did not soften or melt when dried at 90° C. Its specific gravity was found to be 2.03.

EXAMPLE 12

*Basic lead phthalate-lead 2-ethylbutyrate*
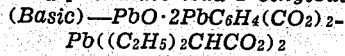

A charge comprising 67 grams of powdered lead monoxide, 22.2 grams of phthalic anhydride, 17.4 grams of 2 ethylbutyric acid and 300 cc. of water was placed in a pebble mill and ground for 16 hours at room temperature. The resultant white product obtained in complete yield, contained no uncombined lead phthalate and did not soften or melt when dried at 90° C. Its specific gravity was found to be 3.02.

In preparing the complex lead compounds of the present invention, the reactants are used in the stoichiometric proportions indicated by the formulae for Type A and Type B compounds. The use of proportions other than these may result in products representing incomplete recovery of the monobasic acid, or the lead phthalate, or both.

The invention contemplates the preparation of products which are mixtures of Type A compounds with Type B compounds as well as mixtures containing lead phthalates, all of which are substantially insoluble in water. For example, mixtures containing monobasic lead phthalate and compounds of Type B may be prepared by using lead monoxide, phthalic anhydride, and monobasic aliphatic acid in the respective molar proportions, $2n:n:2$ where $n$ is 2 or greater than 2. Mixtures of compounds of Type A with normal lead phthalate may be prepared by using lead monoxide, phthalic anhydride and aliphatic acid in the respective molar proportions of $n:n-1:2$ where $n$ is 5 or greater than 5. It has been found that compounds of Type B contain the least amounts of lead monoxide and phthalic acid required to produce insoluble complex lead compounds containing substantially all the aliphatic acid possible in the system.

While the foregoing fully describes and illustrates the present invention, it will be appreciated by those skilled in the art that various modifications may be made within the scope of the appended claims.

We claim:

1. A process for preparing complex lead salts which comprises mixing together in aqueous media lead monoxide, phthalic acid and a monobasic aliphatic acid corresponding to the general formula $C_nH_{2n+1}COOH$ in which $n$ represents the number of carbon atoms, in amounts such that for every 2 molar parts of aliphatic acid, there are present between 2 and 4 molar parts of phthalic acid and between 4 and 5 molar parts of lead monoxide, and while agitating the mixture maintaining the temperature thereof between about 15° C. and 100° C. until the reaction is substantially complete.

2. A process for preparing complex lead salts which comprises mixing together in aqueous media lead monoxide, phthalic acid and a monobasic aliphatic acid selected from the group consisting of acetic, propionic, butyric, isobutyric, caproic, caprylic, and stearic acids in amounts such that for every 2 molar parts of aliphatic acid there are present between 2 and 4 molar parts of phthalic acid and between 4 and 5 molar parts of lead monoxide, and while agitating the mixture maintaining the temperature thereof between about 15° C. and 100° C. until the reaction is substantially complete.

3. A process according to claim 1 wherein the molar ratio of lead monoxide to phthalic acid to aliphatic acid is substantially 5:4:2.

4. A process according to claim 1 wherein the aliphatic acid is acetic acid and the ratio of lead monoxide to phthalic acid to aliphatic acid is 5:4:2.

5. A process according to claim 1 wherein the aliphatic acid is propionic acid and the ratio of lead monoxide to phthalic acid to aliphatic acid is 5:4:2.

6. A process according to claim 1 wherein the aliphatic acid is isobutyric acid and the ratio of lead monoxide to phthalic acid to aliphatic acid is 5:4:2.

7. As a new product a complex lead salt comprising lead phthalate and the lead salt of a monobasic saturated aliphatic acid corresponding to the general formula $C_nH_{2n+1}COOH$ in which $n$ represents the number of carbon atoms.

8. A complex lead salt corresponding to the empirical formula $4PbR \cdot PbX_2$, where R is the phthalic acid radical and X is the radical of a monobasic saturated aliphatic acid corresponding to the general formula $C_nH_{2n+1}COOH$, in which $n$ represents the number of carbon atoms.

9. As a new product the complex lead phthalate-lead acetate salt corresponding to the empirical formula:

$$4PbC_6H_4(COO)_2 \cdot Pb(CH_3COO)_2$$

10. As a new product the complex lead phthalate-lead propionate salt corresponding to the empirical formula:

$$4PbC_6H_4(COO)_2 \cdot Pb(C_2H_5COO)_2$$

11. As a new product the complex lead phthalate-lead isobutyrate salt corresponding to the empirical formula:

$$4PbC_6H_4(COO)_2 \cdot Pb(C_3H_7COO)_2$$

ALEXANDER STEWART.
ADRIAN R. PITROT.
LEONARD M. KEBRICH.

REFERENCES CITED

The following references are of record in the file of this patent:

UNITED STATES PATENTS

| Number | Name | Date |
|---|---|---|
| 1,934,171 | Daniels | Nov. 7, 1933 |
| 2,037,322 | Gardner | Apr. 14, 1936 |
| 2,071,862 | Fisher | Feb. 23, 1937 |
| 2,176,005 | Tullenes | Oct. 10, 1939 |
| 428,017 | Orr | May 13, 1890 |

OTHER REFERENCES

"Annalen der Chemie und Pharmacie," Carius, vol. 148, pp. 66 and 67.